July 24, 1951 S. WALLACE 2,561,545
VARIABLE SPEED CONTROL
Filed June 17, 1946 4 Sheets-Sheet 1
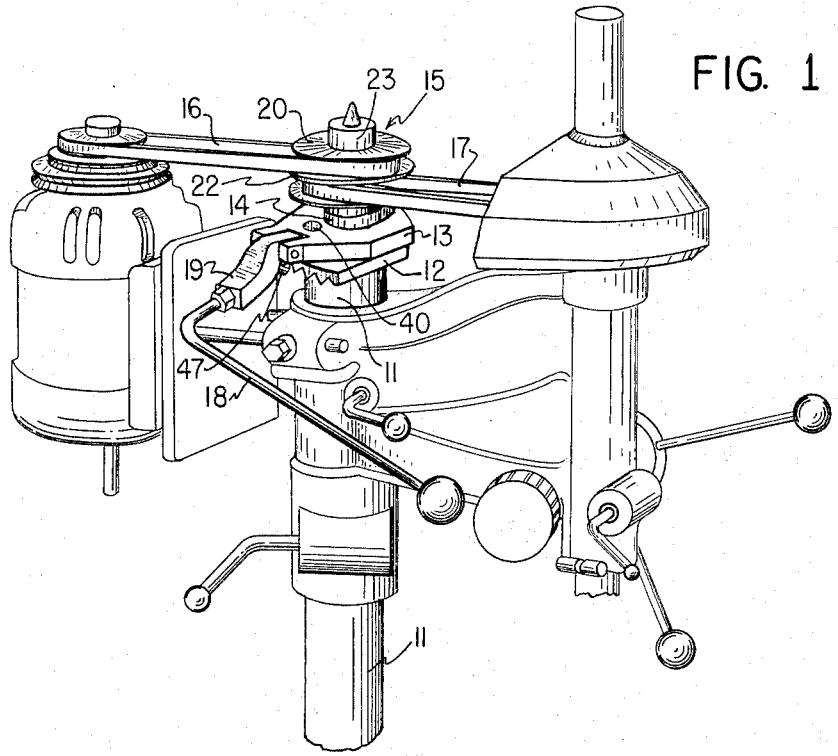
FIG. 1
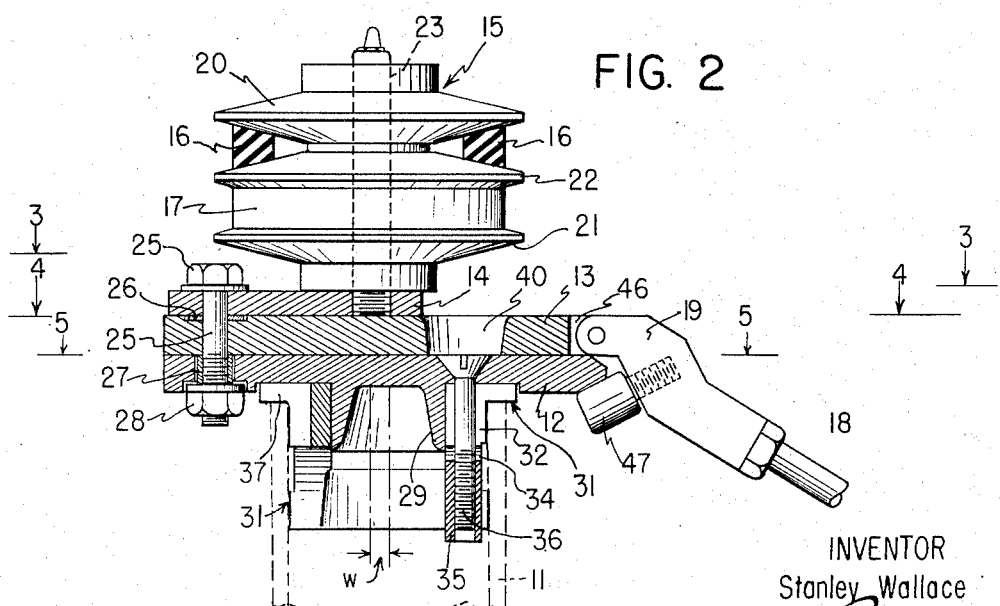
FIG. 2
INVENTOR
Stanley Wallace
By 
Attorney July 24, 1951  S. WALLACE  2,561,545
VARIABLE SPEED CONTROL
Filed June 17, 1946  4 Sheets-Sheet 2
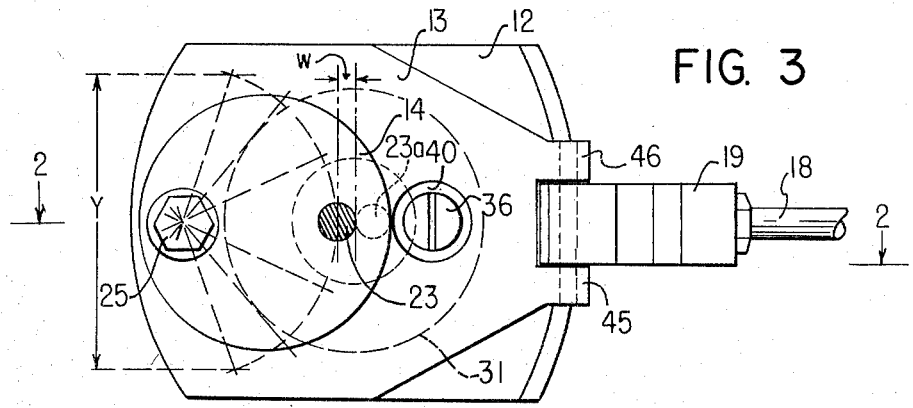
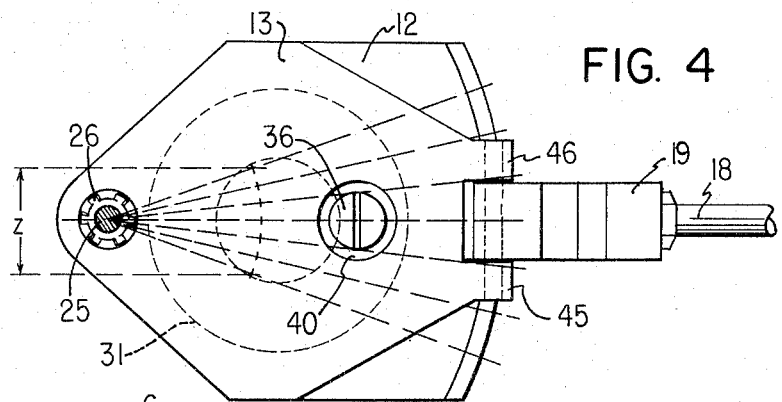
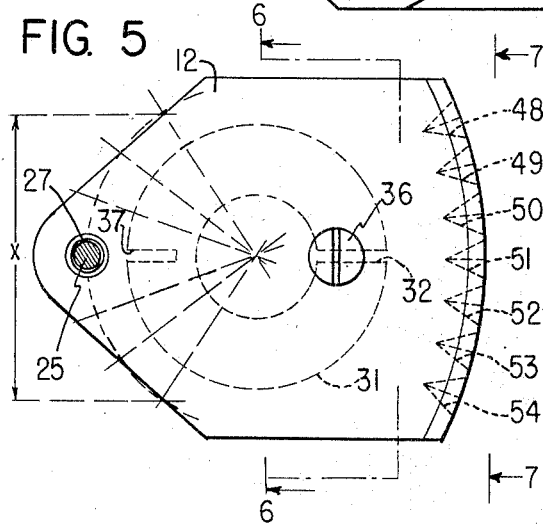
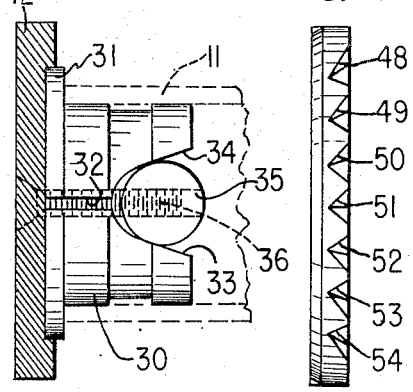
INVENTOR.
Stanley Wallace
BY
Attorney July 24, 1951  S. WALLACE  2,561,545
VARIABLE SPEED CONTROL
Filed June 17, 1946  4 Sheets-Sheet 3

INVENTOR.
Stanley Wallace
BY
Attorney

July 24, 1951

S. WALLACE 2,561,545

VARIABLE SPEED CONTROL

Filed June 17, 1946

INVENTOR.
Stanley Wallace
BY
Attorney

Patented July 24, 1951

2,561,545

UNITED STATES PATENT OFFICE 2,561,545

VARIABLE SPEED CONTROL

Stanley Wallace, Des Plaines, Ill.

Application June 17, 1946, Serial No. 677,344

10 Claims. (Cl. 74—230.17)

The invention is concerned with a variable speed transmission of the V-belt type in which a driving pulley is arranged in belted relation with a driven pulley through the medium of a pair of V-belts engaging expandable pulleys and wherein the speed ratio between the driving and driven pulleys may be varied by varying the radius of the arc which the belts travel around their associated expandable pulleys.

The principal object of the invention is to provide a novel, easily installed and dependably operating variable speed control device for use with machine tools such as drill presses, lathes and the like, which extends the operating range and enhances the utility of such machine tools by enabling the operator to apply correct speeds, in the case of drill presses, correct speeds for large and small drills engaging the material to be drilled and, in the case of lathes, correct speed of the workpiece engaged by any particular cutting or shaping tool.

The new device, when used, for example, in connection with a drill press, comprises means for laterally setting the expandable pulleys disposed between the motor-operated driving pulley and the spindle-operating driven pulley in a desired initial position, and adjusting means controlled by a simple shift lever for laterally displacing the expandable pulleys during the operation of the drill press, for the purpose of varying the speed of the drill spindle and therewith the speed of the drill. The adjusting range covers reduction of the speed of the driven pulley in excess of 40% of normal speed and increase of speed thereof in excess of 70% of normal speed. The term "normal speed" means the speed that is normally available in any particular belt setting. The advantages of the new device are particularly pronounced when the device is used with drill presses equipped with multiple-step pulleys and/or multiple-spindle turrets, because the wide range of speed adjustment which is available in any initial coacting placement of the belts on their associated pulleys and in any initial lateral setting of the expandable pulleys, by the simple operation of the shift lever permits successive or alternate use of numerous drills of different sizes without work stoppage for rearranging the belts.

When used in connection with a lathe, the new device comprises generally the same or equivalent parts as intimated above, thereby enabling the operator to adjust the speed of the work spindle by the actuation of the shift lever, during the operation of the lathe, to facilitate numerous operations, e. g., the drilling of small diameter holes at proper high speeds; the threading, tapping or knurling at low speeds; and the turning at normal cutting speeds.

The device eliminates in either case of use, in a drill press as well as in a lathe, the necessity for secondary or intermediate operations, changing belts or the like, thus increasing and greatly facilitating production. In the case of lathes the device assures precision and concentricity of parts because it permits carrying out several distinct operations, e. g., radial and axial turning, drilling, peripheral knurling, internal or external threading or tapping, without changing chucks.

A further object of the invention is realized by the provision of an automatic speed shift or speed adjustment control which may be applied either when the device is used with a drill press or with a lathe.

The automatic speed adjustment control comprises a member, e. g., a lever arm, which is actuated by the axial displacement of the drill spindle or, in the case of a lathe, by the transverse displacement of the cross slide. The lever arm is suitably linked with the shift lever of the speed control device and thus effects automatic adjustment of the speed of the drill spindle, or in the case of a lathe of the work spindle, in accordance with the position of the drill or the cutting tool, respectively. Such control is useful in connection with the drill press when it is desired to drill material of different density, e. g., a workpiece which is composed of layers of different materials, requiring successively different drill speeds, and is likewise useful in connection with a lathe, e. g., when it is desired to cut in a radial plane, requiring progressively different rotary speed of the workpiece in accordance with the position of the cutting tool radially thereof in order to maintain the linear cutting speed constant.

Another object has to do with the provision of means for securing by means of a single fastening member, the assembly of a plurality of three individually adjustable elements of the new device in such a manner that two of said elements are linked together in predetermined position relative to each other while remaining movable and adjustable as a unit with respect to the third element.

Still another object is concerned with the provision of a novel speed range chart which may be supplied with the new speed control device. The chart furnishes information as to speed ranges available in various belt settings and correlates the various drill sizes with such speed ranges.

Details of the invention will appear from the description of certain embodiments, which is presented below with reference to the accompanying drawings.

Fig. 1 illustrates a diagrammatic perspective view of an embodiment of the new speed control device as used in a drill press;

Fig. 2 shows a diagrammatic vertical section through the new device taken approximately along lines 2—2 of Fig. 3;

Fig. 3 is a diagrammatic top view of the device as seen when looking down in a plane approximately along lines 3—3, Fig. 2, showing the relative position of the principal parts including a holder for the expandable pulleys, an adjusting plate which is operable by a shift lever, and underneath the adjusting plate a base plate;

Fig. 4 represents a diagrammatic sectional view of the device taken approximately along lines 4—4 of Fig. 2, showing the adjusting plate without the holder and underneath the adjusting plate the base plate;

Fig. 5 shows a diagrammatic sectional view taken approximately along lines 5—5, Fig. 2, illustrating a top view of the base plate with the adjusting plate and holder removed therefrom;

Fig. 6 illustrates a transverse section taken through the base plate approximately along lines 6—6 of Fig. 5, showing the manner in which the base plate is mounted;

Fig. 7 is an end view of the base plate;

Figure 8:
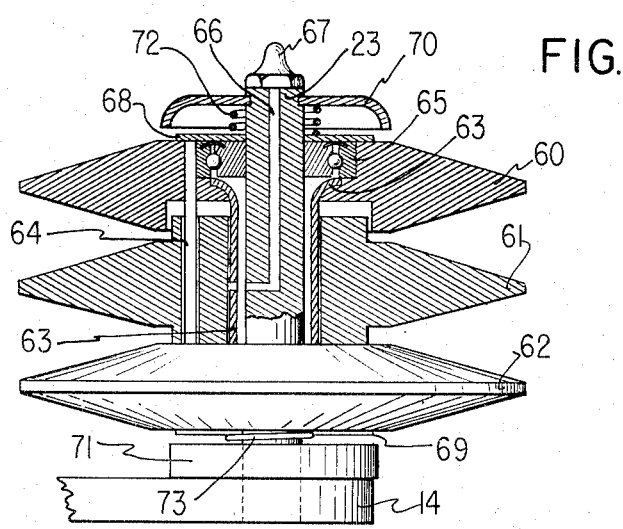
Fig. 8 represents a diagrammatic view, partially in section, of a modified mounting for the expandable pulleys.

The new speed control device, as shown in Fig. 1, is mounted on top of the tubular stationary supporting column 11 of the drill press. It comprises a base plate 12 which may be fixed in predetermined angular position on the column 11; an adjusting plate 13 which is adjustably pivotally mounted on the base plate 12; and a holder 14 which is adjustably pivotally mounted on the adjusting plate 13. On the holder 14 is secured the spindle carrying the expandable pulleys which are in Figs. 1 and 2 generally indicated by the numeral 15. Numeral 16 designates the driving belt and 17 the driven belt. The driving belt 16 engages the driving pulley operated by the motor, and the driven belt engages the driven pulley which operates the drill spindle. The adjusting plate 13 and with it the holder 14 may be angularly displaced during the operation of the driving and driven pulleys by means of a shift lever 18 for the purpose of shifting the expandable pulleys laterally with respect to the driving and driven pulleys. A latch 19 is provided which is equipped with a pin 47 for selective engagement with any one of several notches in the arcuate forward edge of the base member 12. The initially desired lateral position of the expandable pulleys 15, relative to the driving and driven pulleys, is determined by angular setting of the base member 12 on the tubular supporting column 11 or by suitable angular setting of the holder 14 on the adjusting plate 13. Such initial setting predetermines the initially desired normal speed ratio between the driving and driven pulleys of the drill press. This normal speed ratio may be changed during the operation of the drill press by actuating the shift lever 18, first lifting the latch 19 so as to disengage the latch pin 47 from a notch in the edge of the base plate and thereafter angularly rotating the adjusting plate 13 so as to effect lateral displacement, in one or the other direction, of the expandable pulleys with respect to the driving and driven pulleys to change the speed ratio between the driving and driven pulleys from the normal speed ratio initially set.

The essential parts of the new speed control device, as described above, are shown in Fig. 1 in prominent lines. The remaining parts of the drill press are shown in phantom view in faint outline. The drill press as such is generally known, and its parts will not be referred to except for explanatory purposes that may be required for conveying an understanding of the invention. Details of the new device are described below with reference to Figs. 2–7, inclusive.

The expandable pulley unit 15 may be of conventional type, comprising the end flange members 20, 21 and the centrally disposed flange member 22 which is axially movable with respect to the end flange members. All the flange members are rotatable on the spindle 23. Therefore, lateral shifting of the expandable pulley unit will change the position of the axis of the spindle 23 with respect to the axes of the driving and driven pulleys, thereby reducing the radius of the arc of travel around the expandable pulleys of one belt, while increasing the radius of the arc of travel of the other belt, and thus changing the speed ratio between the driving and the driven pulleys. In Fig. 2, such lateral displacement of the expandable pulleys is effected in a direction substantially perpendicular to the plane of the drawing.

The spindle 23 is secured at its lower end in the top plate 14 which constitutes the holder for the expandable pulleys. The holder 14 is angularly adjustably mounted on the adjusting plate 13 and the latter, operating with the holder as a unit, is angularly adjustably mounted on the base plate 12 by means of the pivot bolt 25. The mounting is such that, when the pivot bolt is loosened, the holder 14 as well as the adjusting plate 13 may be individually angularly displaced with respect to the base plate 12. But when the bolt is tightened the holder 14 is linked or fixed in frictional engagement with the adjusting plate 13 in any predetermined angular position relative thereto, while the latter is with the holder rotatable on the base plate 12.

The above described mounting is obtained by the provision of friction means between the holder 14 and the adjusting plate 13, which may be in the form of a so-called star-lock-washer 26 positioned in a recess in the adjusting plate as shown in Figs. 2 and 4. This washer has a number of peripherally radially extending projections which are angularly twisted with respect to the plane of its body portion. Accordingly, relative angular displacement of the holder 14 and the adjusting plate 13 is possible so long as the pivot bolt 25 is loose, but when the pivot bolt is tightened, the edges of the projections of the star-lock-washer will bite into the material of the holder 14 as well as into the material of the adjusting plate 13, thereby providing for a frictional engagement between these two parts and locking them together in any predetermined relative angular position. The boring in the base plate 12 is of a larger diameter than required by the diameter of the bolt 25 and accommodates a tubular sleeve 27 which is slightly longer than the thickness of the material of the base plate 12 at the point where the pivot bolt is disposed. Accordingly, when the pivot bolt is in place as shown in Fig. 2 and when the nut 28 is tightened, the sleeve 27 acts in the manner of a journal for the adjusting plate 13 and keeps the adjusting plate with its holder 14 rotatable on the base plate 12.

The entire unit is mounted on the tubular supporting column 11 by means of a base bushing adapted to hold the base plate and in turn engaging the supporting column in angularly adjustable position relative to the column. The mounting is in detail explained below.

The base plate 12 is provided with an axially projecting extension 29 (see Fig. 2) which is inserted into the tubular bushing-like base member 30 provided with a flange 31. The flange 31 is accommodated in part in a recess in the base member 12, as shown in Figs. 2 and 6. The bushing-like base member is longitudinally split as indicated in Figs. 2, 5 and 6 by numeral 32, the slot extending through the tubular shank of the bushing and being widened in its lower part to provide two opposed sloping edges 33 and 34. The opening defined by the sloping edges 33 and 34 accommodates a clamp member 35 which may be in the form of a disk provided with a transverse threaded hole for receiving the screw 36. The latter extends through a hole in the base plate 12. When this screw is tightened it draws upwardly the disk-like clamp member 35, thus exerting outward pressure on the sloping edges 33 and 34 and spreading the bushing laterally to effect locking engagement thereof, first, with the base plate 12 by engagement of the flange 31 and, second, with the tubular supporting column 11 by engaging the inside of the column with its tubular shank. The single screw 36 coacting with the clamp member 35 and the latter coacting with the split bushing-like member 30 thus locks the three parts, that is, the base plate 12, base bushing 30 and the tubular supporting column 11, together in any desired predetermined relative angular position with respect to the supporting column. In order to relieve the stress on the material of the base bushing that may be caused by the spreading of the bushing by the clamp member 35, the bushing may be partially split on the opposite side from the slot 32, as indicated in Figs. 2 and 5 at 37.

The adjusting plate 13 is provided with a hole 40 for the purpose of gaining access to the screw 36 when it is desired to effect angular adjustment of the base plate 12 and of the base bushing 30 with respect to the supporting column 11. Such adjustment is effected without trouble simply by rotating the plate 13 so as to position the hole 40 above the screw 36 and loosening the bolt 25, if required, to rotate the expandable pulleys out of the way so as to manipulate the screw-driver through the hole 40. The expandable pulley unit is then brought back to initial desired position and the bolt 25 is again tightened.

It will be seen from the explanations rendered above that the structure provides for a plurality of selective adjustments of the position of the spindle 23 of the expandable pulleys 15 with respect to the axes of the driving and driven pulleys. First, the pivot point 25 may be angularly placed in a desired position by angular adjustment of the base plate 12 on the supporting column 11; second, the holder 14 may be placed in desired angular position with respect to the adjusting plate 13. Both adjustments affect the initial position of the spindle 23 and therewith of the expandable pulleys 15 relative to the driving and driven pulleys. The axis of the spindle 23 of the expandable pulleys, as shown in Figs. 2 and 3, is offset with respect to the axis of the supporting column 11 by an amount indicated in dot-dash lines and marked by the reference character W. The offset position of the spindle axis provides for a third initial adjustment of the position of the expandable pulleys. The lateral shifting of the expandable pulleys in any initially adjusted position is accomplished by selective operation of the adjusting plate 13. All these adjustment possibilities will be presently explained in detail after completing the description of the means for variably adjusting the angular position of the adjusting plate 13 to shift the expandable pulleys laterally during the operation of the drill press.

The variable adjusting means comprises two arms 45 and 46 which extend from the adjusting plate 13. Hingedly mounted in these arms is the latch member 19 carrying the handle or shift lever 18. (See also Fig. 1.) The latch member 19 is provided with the latch pin 47 (Figs. 1 and 2) which coacts with inclined notches 48–54, respectively, in the arcuate forward edge of the base plate 12. The adjusting plate 13 (to which is linked the holder 14) can thus be angularly rotated on the base plate 12 to place the latch pin 47 selectively in engagement with any one of the inclined notches 48–54 for the purpose of securing the adjusting plate in any desired angular position relative to the base plate. The angular shifting or rotating of the adjusting plate 13 effects lateral displacement of the expandable pulleys to change the speed ratio during the operation of the drill press.

The foregoing completes the description of the physical parts of the new device. A brief summary, in terms of mounting the device as well as in terms of its adjustment possibilities, is presented below.

The device, with its parts assembled as shown in Fig. 2, is placed on the tubular supporting column 11 of the drill press by inserting the tubular base bushing 30 into the supporting column. The driving and the driven belts 16 and 17 are put in position on the coacting flanges of the expandable pulleys, as shown. The first step in the initial setting of the device is to determine the initially or normally desired lateral position of the expandable pulleys relative to the driving and driven pulleys to provide the normal speed ratio between the pulleys. Such initial position of the expandable pulleys may be roughly set in one of two ways.

With the adjusting member or plate 13 in the neutral position as shown in Figs. 3 and 4, the base plate 12 with the base bushing 30 may be rotated around the axis of the tubular supporting column 11, into a desired angular position. Such adjustment displaces the pivot point 25 of the adjusting plate 13 along an arc the radius of which is determined by the distance of the axis of the pivot pin 25 from the axis of the tubular supporting column. This adjustment is indicated in dotted lines in Fig. 5. It will be seen that the pivot point 25 of the adjusting plate 13 can thus be displaced angularly, for example, by desired amounts within a range indicated in Fig. 5 by the character X. Several radial lines are shown intersecting the arc of displacement of the pivot point 25, the intersecting points indicating several arbitrarily assumed points of adjustment of the pivot point 25. Inasmuch as the holder 14 which secures the expandable pulleys by means of the pulley spindle 23 is assumed to be in the position shown in Fig. 3, such angular adjustment of the base plate, that is to say, of the entire device on the tubular supporting column, will have the effect of angularly displacing the spindle 23 and therewith laterally displacing the expandable pulleys relative to the driving and driven pulleys. The adjustment path of the pivot point is arcuate but, of course, results in lateral shifting of the expandable pulleys relative to the driving and the driven pulleys of the drill press.

Alternatively, the device may be fixed on the tubular supporting column 11 by tightening the screw 36, thereby drawing the clamp member 35 upwardly and spreading the base bushing 30 as previously described, and the initially desired lateral position of the expandable pulleys may be roughly set by loosening the pivot bolt 25 and angularly rotating the holder 14 (see Fig. 3) with respect to the adjusting plate 13. Such displacement of the holder rotates the spindle 23 and therewith the expandable pulleys along an arc around the pivot point 25, as indicated in dotted lines in Fig. 3. As in the former case, a number of radial lines are shown dotted in Fig. 3 intersecting the arc of displacement of the spindle 23. The intersecting points show a number of arbitrarily assumed positions of the spindle 23. Also as in the former case, the displacement path of the holder 14 is arcuate, but the net result is lateral displacement or shifting of the spindle 23 relative to the axes of the driving and driven pulleys by a desired amount within a range roughly indicated in Fig. 3 by the character Y.

After the initial position of the expandable pulleys is set as above described, the pivot bolt 25 is tightened, thus compressing the star-lock-washer 26 (Figs. 2 and 4), thereby locking the holder 14 in frictional engagement with and on the adjusting plate 13, keeping it in the angularly adjusted position with respect thereto. The journal sleeve 27 (Fig. 2) is clamped between the under side of the adjusting plate 13 and the washer compressed against it by the nut 28 and, inasmuch as the sleeve is somewhat longer than the material of the base plate at the point of attachment, the adjusting plate 13 and with it the holder 14 will remain rotatable and angularly adjustable as a unit on the base plate 12.

A fine adjustment may then be effected by rotating the base plate 12 with the base bushing 30 angularly with respect to the supporting column 11. If it is assumed that the initially desired position of the spindle 23, and therewith of the expandable pulleys, corresponds to that in which the mechanism is shown in Fig. 3, and that the base plate 12 with the base bushing 30 is now angularly displaced with respect to the supporting column 11, we will obtain angular displacement of the spindle 23 around an arc the radius of which corresponds to the amount W by which the pulley spindle 23 is offset from the axis of the base bushing 30. The result is angular laterally effective displacement, by a small amount, of the spindle 23 and therewith corresponding lateral shifting, by a small amount, of the expandable pulleys relative to the axes of the driving and driven pulleys.

Instead of placing the spindle 23 on the holder 14 in a position offset to the left of the median center line, by an amount W, as shown in Figs. 2 and 3, it may be secured on the holder in a position offset to the right, as indicated in Fig. 3 in dotted lines marked 23a. Such offset may again be utilized for fine adjustment of the spindle position and of the expandable pulleys carried thereby, by rotating the base plate 12 with the base bushing 30, as in the former case, angularly with respect to the supporting column 11. Incident to such angular rotation or setting of the base bushing relative to the base plate, we will again obtain angular displacement of the spindle 23 around an arc the radius of which will correspond to the amount by which the axis of the pulley spindle 23 is offset from the axis of the base bushing. It will be observed, of course, that the offset of the spindle 23 to the position 23a (Fig. 3) will also affect the radius of angular displacement of the spindle axis responsive to angular setting of the holder 14 relative to the adjusting member 13, because of increased distance of the spindle axis from the pivot point 25.

After the rough and fine adjustments as above described are effected, determining the initially desired normal lateral position of the expandable pulleys, the device is ready for operation. It is assumed, of course, that the clamp screw 36 has been tightened in place, effecting proper mounting engagement of the base plate 12 with the base bushing 30 and of this bushing with the inside of the tubular supporting column 11, and that the pivot bolt 25 has been tightened to lock the holder 14 in angularly properly adjusted position in frictional engagement with the adjusting plate 13 while the latter remains movable on the base plate 12.

The drill press operation can proceed and during the operation there is the possibility of varying the speed ratio between the driving and the driven pulleys, simply by shifting the adjusting plate 13 angularly around its pivot point 25, within a range indicated in dotted lines in Fig. 4. The dotted lines extending radially from the pivot point 25 in Fig. 4 intersect the radius of displacement of the spindle 23 of the expandable pulleys, the intersecting points indicating the possible points of adjustment of the expandable pulleys when the latch pin 47 (Fig. 2) engages the corresponding notches 48–54, respectively, in the arcuate forward edge of the base plate 12. The maximum angular displacement of the adjusting plate 13 results in effective lateral displacement of the expandable pulleys within a range marked in Fig. 4 by the character Z. While the adjustment path is arcuate, the net result, as previously explained, is lateral shifting of the expandable pulleys. It is assumed in Fig. 4 that the spindle 23 is positioned on the holder as shown in Fig. 3. If the spindle is in the dotted line setting 23a (Fig. 3) we will obtain a slightly larger range of variable adjustment resulting from the offset of the spindle to the right instead of to the left of the median center line.

The variable speed adjustment is of utmost simplicity, requiring merely lifting and shifting of the lever arm 18 so as to place the latch pin 47 in one or the other notch 48–54, respectively, in the base plate 12. The latch pin 47 in engagement with any one of the locking notches holds the expandable pulleys in corresponding lateral positions of adjustment.

The embodiment so far described assumes a certain type of drill press having the tubular supporting column 11. There are drill presses that may require a different mounting. For example, the mechanism may be mounted on a bracket, disposed above and spaced from the structural parts of the drill press, and the bracket in turn may be suitably mounted on structural parts of the drill press, for example, the motor mounting or on the spindle mounting, respectively. Whether the mechanism is of the type shown in Figs. 1-7, or whether it is of the type intimated above, depending from separate brackets downwardly, its principal parts, adjustments, and the operation will be substantially the same.

Figure 10:
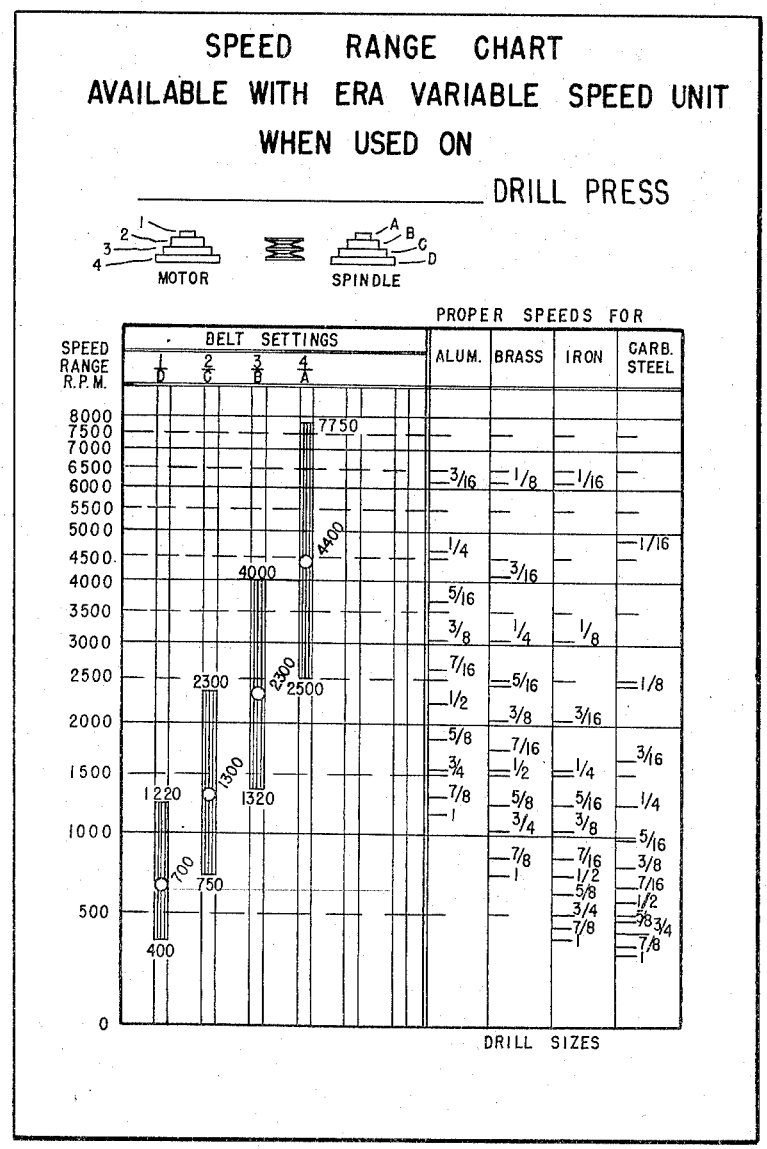
Fig. 10 illustrates an embodiment of the speed range chart made in accordance with the invention.

The advantages of the new device will be apparent by inspecting the speed range chart, Fig. 10. This particular chart may be furnished with a speed control device supplied for a certain type of drill press, for example, for the so-called "Atlas 16-inch" press. The press may be equipped with a four-step motor pulley and with a corresponding four-step spindle pulley. The stationary driving and driven pulleys are diagrammatically indicated in the chart, and the expandable pulleys are diagrammatically indicated between the stationary pulleys. Below this diagram the chart shows the various possible belt settings; the speed range in R. P. M.; and the proper speeds for various materials, including aluminum, brass, iron and carbon steel which is a high carbon tool steel. In the columns indicating the materials are entered the drill sizes. Below the various belt settings are indicated the speed ranges which are available. Assuming, for example, that the belts are set for low speed, the step 1 of the motor pulley will be belted through the medium of the expandable pulleys with the step D of the spindle pulley. Without the new variable speed control, such belt setting would provide for a speed of 700 R. P. M. The new variable speed control, in this particular belt setting, enables the operator to adjust the speed within a range of from 400 R. P. M. up to 1220 R. P. M. In other words, the new speed control enables the operator to decrease the speed from the normal of 700 R. P. M. by about 42% and to increase the speed by about 74% of the normal speed. Likewise, assuming a belt setting which links the step 2 of the motor pulley through the medium of the expandable pulleys with the step C of the spindle pulley, the present variable speed control will enable the operator to adjust the speed from the normal of 1300 R. P. M. down to 750 R. P. M.; that is, he will be able to decrease the speed during the operation of a drill press by about 42% and will be likewise able to increase the speed from the normal speed of 1300 R. P. M. up to 2300 R. P. M., or about 76% of the normal speed. In a similar manner, assuming a belt setting which connects the pulley step 3 of the motor pulley by way of the expandable pulleys with the step B of the spindle pulley, the operator is enabled to adjust the speed to a low of 1320, or about 43% of the normal speed of 2300 and to a high of 4000 which corresponds to about 74% increase from the normal of 2300 R. P. M. Assuming, finally, a belt setting which connects the step 4 of the motor pulley by way of the expandable pulleys with the step A of the spindle pulley, which setting without the new variable speed control would furnish a spindle speed of 4400 R. P. M., the operator, having available the advantages of the new speed control, is enabled to operate within a range of from 2500 R. P. M. up to 7750 R. P. M., which corresponds to a reduction of speed from the normal of 4400 by about 43% and to an increase of speed from the normal of 4440 R. P. M. by about 76%.

The "normal" speed ratio, that is to say, the normal or initially desired speed of the drill spindle, can be predetermined by proper initial setting of the device. The variable adjustments up and down will then refer to the preset or predetermined normal speed instead of to the speed that would be available without the new control device. In other words, it is possible to shift the normal speeds of 700–1300–2300 and 4400 R. P. M., respectively, up or down by certain amounts and to apply variable control up and down from the adjusted normal speeds as reference points.

The speed range chart under the heading of "Belt Settings" carries two spare columns which may be used when multi-step spindles are provided having five or six steps instead of the four assumed in the illustrated case.

The practical significance of the adjustment possibilities will be apparent from an examination of the columns in the speed range chart, which indicate the proper speeds for the various materials. It may be assumed, for example, that the operator handles high carbon tool steel. Without the new speed control he has available in the low speed range a fixed 700 R. P. M. This spindle speed is sufficient for proper operation of a $\frac{7}{16}$" drill. If he has to use a larger or a smaller drill, he does not have the proper speed, or he has to resort to different belt settings. In the present case, without altering the initial belt setting he has available from 400 R. P. M. up to 1220 R. P. M. and therefore can use drill sizes from roughly ¼" up to 1". In the next higher speed range, and assuming again the drilling of high carbon tool steel, he has available from 750 R. P. M. to 2300 R. P. M., which permits operation without any belt changing with drill sizes ranging roughly from $\frac{7}{16}$" to about ⅛". The next higher speed range places him in a position to operate without belt changing with drills from roughly ¼" to just below $\frac{7}{16}$", and the highest speed range gives him the possibility to operate with drills from ⅛" to less than $\frac{1}{16}$" size. Similar possibilities are presented in connection with different materials such as aluminum, brass and iron. The various values in the different speed ranges may be had from Fig. 10.

While the speed range chart, Fig. 10, is furnished particularly for use with the new variable speed unit, it represents and must be considered as a contribution in itself, inasmuch as it facilitates the work and renders information at a glance, which heretofore was not available to the operator.

The proper alignment of the belts in the various settings requires, of course, the usual vertical adjustment of the driving and driven pulleys. The proper belt alignment therefore is a matter left to the judgment and adjusting skill of the operator. Nevertheless, slight variations may occur and, in order to take care of such variations, the invention contemplates the provision of adjustable pulleys which are axially displaceable as a unit, as shown in Fig. 8.

Numeral 14 in Fig. 8 indicates the holder for the drill spindle 23 corresponding to identically marked parts in the previously described drawings. The flanges 60, 61 and 62 are mounted on a sleeve 63, the end flanges 60 and 62 being rigidly connected with the sleeve, while the flange 61 is axially movable on the sleeve. Numeral 64 indicates a pin for guiding the axial displacement of the center flange 61 with respect to the end flanges 60 and 62, respectively. A roller bearing such as 65 is provided at one end of the structure, and a similar roller bearing is provided at the other end. The spindle 23 has a boring 66 for inserting lubricant through the grease fitting 67. A similar lubricating provision is also provided in the previously described structure. The boring 66 extends angularly into the space between the spindle 23 and the sleeve 63 and the sleeve also is provided with a boring, as shown, so as to provide lubrication for the axial displacement of the central flange. Lubricant also enters through the space between the sleeve 63 and the spindle 23 and thus lubricates the bearing 65 at either end of the structure. Washers 68 and 69 are provided, one at either end. A cup 70 is carried by the spindle 23 at its free end and a bottom cup 71 is provided, these cups accommodating springs such as indicated at 72 and 73. The structure operates generally in the same way as the well known expandable pulleys except that the pulleys are rotatable and are also axially movable as a unit, being mounted in floating relation on the spindle. If desired, the structure may be modified by splining the sleeve 63 to the spindle so that it is axially movable thereon, and arranging the pulley flanges rotatable on the sleeve in ball bearings. The sleeve may then be held in a normal position on the spindle by means of springs such as 72, 73 substantially as shown.

Figure 9:
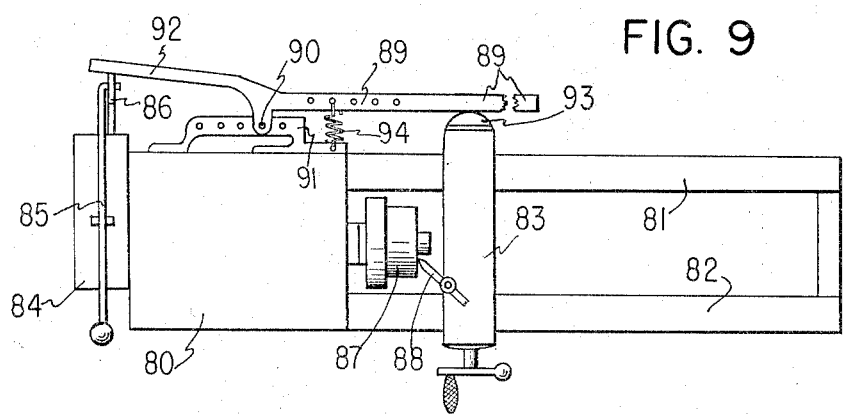
Fig. 9 is a diagrammatic view showing an example of the automatic speed adjustment control in connection with a lathe.

Fig. 9 shows diagrammatically one embodiment of combining with the new speed control an automatic adjustment. The new speed control is assumed to be applied in this case to a lathe, for example, to a so-called "Logan" lathe. Numeral 80 indicates the gear housing. Numerals 81 and 82 indicate the ways of the lathe bed; 83 is the cross slide. The guard housing 84 accommodates the driving and driven pulleys of the lathe. Between the driving and driven pulleys within this guard housing is disposed the new speed control device which may be substantially of the structure described previously in connection with the example of a drill press. The adjusting lever 85 is linked with another adjusting lever 86 which in turn has a pivotal connection with the adjusting plate of the speed control device such as the adjusting plate 13 of the structure described before. The operator of the lathe is thus enabled by manual operation of the lever 85 to adjust the speed of the work spindle and therewith of the workpiece in accordance with the requirements of his cutting, drilling, knurling, tapping and the like tool.

It may be desirable in certain operations to control the speed adjustment automatically. For example, the workpiece 87 in Fig. 9 may require turning or shaping in a radial plane by means of the cutting tool 88. To maintain the linear cutting speed of the tool 88 constant, the rotary speed of the workpiece 87 must in this case change in accordance with the progress of the cutting tool radially with respect thereto. The speed must increase with the progress of the cutting tool radially inwardly of the workpiece and, conversely, it must decrease with the relative position of the cutting tool radially outwardly of the workpiece.

The automatic control contemplates for this purpose a lever arm 89 which is pivotally mounted at 90 on a bracket 91 and has an extension 92 for engagement with the adjusting lever or shift lever 86 of the speed control device. The bracket 91 is provided with a number of holes for the purpose of changing the pivot point 90 as desired. The right hand end of the lever arm 89 engages a template or cam-like member 93 which is provided at the rear end of the cross slide 83. A spring 94 is secured at one end in an extension of the bracket 91 and the other end is secured in one of several holes in the lever arm 89 to hold the lever 89 resiliently in engagement with the guide bracket or cam 93. Accordingly, when the cross slide 83 is displaced transversely of the ways 81 and 82, it moves the lever arm 89 inwardly or outwardly as the case may be, thus angularly displacing the arm 92, and the latter in turn displaces the arm 86 which effects the angular displacement or shifting of the adjusting plate (such as adjusting plate 13 of the previously described structure) of the speed control unit disposed between the driving and driven pulleys within the guard housing 84. The arrangement does not interfere with the displacement of the cross slide on the ways 81, 82 longitudinally thereof.

The arrangement shown in Fig. 9 may also be sensibly applied in a drill press simply by providing a suitable linkage between the drill spindle and the actuating lever arm of the speed control device. Such automatic speed control adjustment may be desirable in a drill press, for example, as mentioned before, when it is required to drill material of different density such as a workpiece composed of different material parts. The automatic control in this case, as well as in case of a lathe, may be combined with cam means, taking the place of the cam or bracket 93 in Fig. 9, which effects change of speed in predetermined steps rather than in continual progression.

The invention has been described in connection with belt driven pulleys. It will be understood that the invention is also applicable in the case of chain or other drives. Examples of using the speed control have been given in connection with drill presses and lathes. It will likewise be understood that the invention may be applied in connection with different types of machines.

Changes may be made within the scope and spirit of the accompanying claims in which is defined what is considered new and desired to have protected by Letters Patent of the United States.

I claim:

1. A speed control device for varying the speed ratio between a driving and a driven member comprising a stationary mounting, a flanged tubular longitudinally slotted bushing disposed in said mounting, a base plate carrying an axially projecting extension for insertion in said bushing, a clamp member engaging the slot in said bushing, a screw extending through said base plate for threaded engagement with said clamp member to spread said bushing for securing said bushing and said base plate in relative angularly adjusted position in angularly fixed engagement with said stationary mounting, an adjusting plate, pivot means for pivotally mounting said adjusting plate on said base plate, expandable speed transmitting members secured on said adjusting plate for driving connection with said driving and driven members, means for angularly displacing said adjusting plate to shift said expandable speed transmitting members laterally relative to said driving and driven members to vary the speed ratio therebetween, a latch member, and notches in said base plate for engagement by said latch member to control the angular displacement of said adjusting plate.

2. The structure and combination defined in claim 1, together with a holder disposed on said adjusting plate for securing said expandable speed transmitting members, said holder being pivotally secured on said adjusting plate by said pivot means.

3. A variable speed control device for use with a driving and a driven pulley arranged in belted relation through the medium of V-belts engaging expandable pulleys, said device comprising a mounting, an adjusting member on said mounting, said expandable pulleys being carried by said adjusting member, means for adjusting said adjusting member to set the axis of said expandable pulleys in desired initial position relative to the axes of said driving and driven pulleys so as to determine the initially desired normal speed ratio therebetween, means for thereafter moving said adjusting member at will during the operation of said driving and driven pulleys to displace the axis of said expandable pulleys relative to the axes of said driving and driven pulleys for the purpose of selectively varying the initially determined speed ratio therebetween, said mounting comprising a base member carrying said adjusting member, a bushing for holding said base member, a stationary support for holding said bushing, and means for securing said bushing in predetermined angular position with respect to said stationary support and said base member in predetermined angular position with respect to said bushing.

4. A variable speed control device for use with a driving and a driven pulley arranged in belted relation through the medium of V-belts engaging expandable pulleys, said device comprising a holder for said expandable pulleys, an adjusting member, a base member, means for securing said holder on said adjusting member in predetermined angular position relative thereto to set the axis of said expandable pulleys in desired initial position relative to the axes of said driving and driven pulleys so as to determine the initially desired normal speed ratio therebetween, means for pivotally securing said adjusting member with said holder on said base member, means for moving said adjusting member with said holder relative to said base member at will during the operation of said driving and driven pulleys to displace the axis of said expandable pulleys relative to the axes of said driving and driven pulleys for the purpose of selectively varying the initially determined speed ratio therebetween, friction means interposed between said holder and said adjusting member, journal means for said adjusting member carried by said base member, and means for effecting the operative actuation of said friction means and said journal means.

5. A variable speed control device for use with a driving and a driven pulley arranged in belted relation through the medium of V-belts engaging expandable pulleys, said device comprising an adjusting member for holding said expandable pulleys, a platelike base member, means for pivotally mounting said adjusting member at one end of said base member, means including said base member for adjusting said adjusting member to set the axis of said expandable pulleys in desired initial position relative to the axes of said driving and driven pulleys so as to determine the initially desired normal speed ratio therebetween, lever means extending from said adjusting member for thereafter moving said adjusting member relative to said base member at will during the operation of said driving and driven pulleys to displace the axis of said expandable pulleys relative to the axes of said driving and driven pulleys for the purpose of selectively varying the initially determined speed ratio therebetween, and means for controlling the speed-adjusting movement of said adjusting member during the operation of said driving and driven pulleys comprising a plurality of notches formed in said base member at the other end thereof, and latch means carried by said lever means for coaction with said notches.

6. A variable speed control device for use with a driving and a driven pulley arranged in belted relation through the medium of V-belts engaging expandable pulleys, said device comprising a platelike adjusting member, a shaft fixedly mounted on said adjusting member and extending from one side thereof perpendicular to the plane of said side, the axis of said shaft being disposed between the axes of said driving and driven pulleys and extending in parallel therewith, said expandable pulleys being journalled on said shaft, means for pivotally mounting said adjusting member, means for adjusting the angular position of said adjusting member to move the expandable pulleys journalled on the shaft extending therefrom through an arcuate path relative to the axes of said driving and driven pulleys so as to set said expandable pulleys in initial position with respect to said driving and driven pulleys, thereby determining the initially desired normal speed ratio therebetween, and means for thereafter angularly moving said adjusting member at will during the operation of said driving and driven pulleys to move said expandable pulleys similarly through an arcuate path so as to vary selectively the distance between the axis of said expandable pulleys and the respective axes of said driving and driven pulleys for the purpose of varying the initially adjusted normal speed ratio therebetween.

7. A variable speed control device for use with a driving and a driven pulley arranged in belted relation through the medium of V-belts engaging expandable pulleys, said device comprising an adjusting member, a holder, a shaft secured on said holder and extending therefrom, the axis of said shaft being disposed between the axes of said driving and driven pulleys and extending in parallel therewith, said expandable pulleys being journalled on said shaft, means for adjustably mounting said holder on said adjusting member, means for moving said adjusting member to move said expandable pulleys through an arcuate path so as to dispose the axis thereof in desired initial position relative to the axes of said driving and driven pulleys, thereby determining the initially desired normal speed ratio therebetween, means for securing said adjusting member in said initial position, and means for thereafter moving said adjusting member at will during the operation of said driving and driven pulleys so as to move said expandable pulleys similarly through an arcuate path for the purpose of selectively varying the distance between the axis of the expandable pulleys and the axes of the respective driving and driven pulleys to vary selectively the initially adjusted normal speed ratio therebetween.

8. The structure defined in claim 7, together with a base member, and means for adjustably securing both said holder and said adjusting member on said base member.

9. A variable speed control device for use with a driving and a driven pulley arranged in belted relation through the medium of expandable pulleys, said device comprising a stationary support, a platelike base member angularly adjustably secured on said support, a platelike adjusting member on said base member, a platelike holder on said adjusting member, a shaft fixedly secured to said holder and extending therefrom perpendicular to the plane thereof, said expandable pulleys being journalled on said shaft and being positioned between said driving and driven pulleys, and means for securing said adjusting member and said holder in assembly and both angularly movable as a unit with respect to said base member, said last-named means comprising a pivot bolt extending through said members, spacer means in said base member for operation as a journal for said adjusting member to permit displacement thereof with respect to said base member, and friction means disposed between said adjusting member and said holder which operates to secure said holder in relatively fixed engagement with said adjusting member.

10. A variable speed control device for use with a driving and a driven pulley arranged in belted relation through the medium of expandable pulleys positioned approximately midway between the axes of said driving and driven pulleys, said device comprising a stationary columnlike support, a base member angularly adjustably mounted on the free end of said support, a platelike adjusting member angularly adjustably disposed on said base member, a platelike holder angularly adjustably disposed on said adjusting member, and a shaft relatively fixedly secured on said holder and extending therefrom perpendicular to the plane thereof for journalling said expandable pulleys, the axis of said shaft being radially offset with respect to the axis of said columnlike stationary support.

STANLEY WALLACE.

REFERENCES CITED

The following references are of record in the file of this patent:

UNITED STATES PATENTS

| Number | Name | Date |
|---|---|---|
| 2,103,464 | Judelsohn | Dec. 28, 1937 |
| 2,157,758 | Jacobsen | May 9, 1939 |
| 2,258,970 | Buettell | Oct. 14, 1941 |
| 2,273,478 | Thompson | Feb. 17, 1942 |
| 2,314,259 | Welty | Mar. 16, 1943 |